Patented July 26, 1938

2,124,742

UNITED STATES PATENT OFFICE 2,124,742

PROCESS FOR PRODUCING COPPER PHTHALOCYANINE

Reginald Patrick Linstead, London, and Charles Enrique Dent, Manchester, England, assignors to Imperial Chemical Industries Limited, a corporation of Great Britain No Drawing. Application May 14, 1936, Serial No. 79,817

6 Claims. (Cl. 260—12)

This application relates to coloring matters of the phthalocyanine series.

It is an object of this invention to provide an improved process for the manufacture of coloring matters of the phthalocyanine series, especially those which contain combined copper, and which will hereinafter be referred to as copper phthalocyanines. Other and further important objects of this invention will appear as the description proceeds.

In British patent specification No. 322,169 there is described a process for the production of blue to green coloring matters by heating phathalic anhydride with ammonia and certain metals or metal compounds including iron, cuprous chloride and nickel sulphide. In British patent specification No. 389,842 (corresponding to U. S. Patent No. 2,000,051) there is described a process for the production of nitrogen-containing coloring matters of complex constitution which comprises heating an o-cyanoarylcarboxyamide in the presence of specified metals and metal compounds. These coloring matters are described as purple to green in color and stated to appear to belong to one general class, this class appearing to include the said coloring matters of British patent specification No. 322,169.

We have now found that coloring matters of the same general series, but which contain copper—in other words, copper phthalocyanines—can be prepared neatly and simply by heating the metal-free phthalocyanine in the presence of copper or copper compounds, either alone or in the presence of a liquid medium.

As liquid media for this process are naturally chosen those in which phthalocyanine is perceptibly soluble. Typical are quinoline, methylnaphthalene and chloronaphthalene. Since the reaction proceeds most quickly at rather elevated temperatures, media such as those mentioned, which have high boiling points are preferred. However a low boiling medium under pressure may also be employed.

The proportions of reagents necessary may vary within wide limits. The theoretical proportions are 1 mole of phthalocyanine to 1 atom of copper. For this purpose the molecular weight of phthalocyanine may be taken as 514, which corresponds to the empirical formula

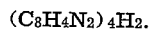

$(C_8H_4N_2)_4H_2$.

Best results, however, are obtained by using an excess of copper. The excess copper may then be removed by precipitating the reaction product from sulfuric acid. If a deficiency of copper is employed, the reaction will proceed but partly, and the reaction product will consist of a mixture of copper phthalocyanine and metal-free phthalocyanine.

Without limiting our invention to any particular procedure, the following examples, in which parts by weight are given, will serve to illustrate our preferred mode of operation.

Example 1

50 parts of phthalocyanine (the metal-free compound, as obtainable for instance by the process of Examples 6 or 7 of U. S. Patent No. 2,000,051) is treated for 30 hours with 6 to 10 parts of copper bronze, in boiling quinoline. This crystalline product thus obtained is washed free from quinoline, and dissolved in concentrated sulfuric acid. The solution is filtered through sintered glass or other medium suitable for filtering concentrated sulfuric acid, and is carefully diluted by mixing with ice. The product resulting is filtered off, washed free from acid and dried. Its composition was found by analysis to be as follows: C, 66.2%; H, 2.9%; N, 19.4%; Cu, 11.2%. The calculated composition for

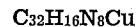

$C_{32}H_{16}N_8Cu$ is C, 66.7%; H, 2.8%; N, 19.5%; Cu, 11.0%.

Example 2

The procedure is the same as in Example 1, except that chloronaphthalene is employed as a solvent in lieu of quinoline.

In a manner similar to the above, the copper compound of other members of the phthalocyanine series, for instance those derivable from the ortho-dicyanides of naphthalene or anthracene, or from nuclearly substituted phthalonitrile, may be obtained.

In lieu of copper or copper bronze, a compound of copper may be employed; for instance, cupric oxide, cupric chloride, cupric sulfate, cuprous chloride, cuprous bromide, acetates, etc. The above group of substances, including copper or copper-bronze, may be termed generically as "cupriferous reagents", inasmuch as they all contain copper and are capable of yielding the same in chemical reactions.

Many other variations and modifications may be made in our preferred mode of procedure without departing from the spirit of this invention.

Example 3

50 parts of metal-free phthalocyanine are intimately mixed with 8 parts of cupric oxide and the mixture heated at 250–300° C. for about 3 hours. The reaction mass is cooled, ground, dissolved in concentrated sulfuric acid and the solution is poured into water.

*Example 4*

1 part of metal-free phthalocyanine, 1 part of cupric chloride and 25 parts of ethyl alcohol are heated to reflux for about 1 hour, and the suspended coloring matter then filtered off. It consists almost entirely of copper phthalocyanine. It can be purified by dissolving in concentrated sulfuric acid, precipitating in water, filtering and drying.

*Example 5*

1 part of metal-free phthalocyanine, 1 part of cupric acetate and 30 parts of pyridine are heated to reflux for about 1 hour, and the suspended coloring matter is filtered off and dried. It consists almost entirely of copper phthalocyanine.

We claim:

1. The process of producing a copper-containing coloring matter of the phthalocyanine series, which comprises heating the corresponding metal-free coloring matter in an organic solvent for the same, in the presence of a substance capable of yielding copper atoms.

2. The process of producing copper-phthalocyanine, which comprises heating metal-free phthalocyanine in an organic medium which has a solvent action on metal-free phthalocyanine, at a temperature above 200° C., in the presence of a cupriferous agent.

3. The process of producing copper-phthalocyanine, which comprises heating metal-free phthalocyanine in a high boiling organic solvent for the same, at a temperature above 200° C., in the presence of copper.

4. The process of producing copper-phthalocyanine, which comprises boiling metal-free phthalocyanine in an organic liquid which boils above 200° C. and which has a solvent action on metal-free phthalocyanine, in the presence of metallic copper.

5. The process of producing copper-phthalocyanine, which comprises boiling metal-free phthalocyanine and an excess of metallic copper in quinoline, recovering the reaction product, and separating the same from excess copper by recrystallization from concentrated sulfuric acid.

6. A process as in claim 5, the quantity of copper employed being in excess of 63.5 parts by weight per 514 parts of phthalocyanine.

REGINALD PATRICK LINSTEAD.
CHARLES ENRIQUE DENT.